United States Patent [19]

Winokur et al.

[11] Patent Number: 5,539,877
[45] Date of Patent: Jul. 23, 1996

[54] PROBLEM DETERMINATION METHOD FOR LOCAL AREA NETWORK SYSTEMS

[75] Inventors: Alex Winokur, Haifa; Joseph Shiloach, Kiriak Tiv'on; Amnon Ribak, Misgav, all of Israel; Yuangeng Huang, Travis County, Tex.

[73] Assignee: International Business Machine Corporation, Armonk, N.Y.

[21] Appl. No.: 266,073

[22] Filed: Jun. 27, 1994

[51] Int. Cl.⁶ .................................................. G06F 11/34
[52] U.S. Cl. ................. 395/183.02; 395/183.01; 395/185.01
[58] Field of Search ............................ 395/575, 183.02, 395/183.01, 185.01; 371/15.1, 30, 48; 364/488, 489, 490, 491; 324/73, 158 R

[56] References Cited

U.S. PATENT DOCUMENTS

| | | | |
|---|---|---|---|
| 4,803,641 | 2/1989 | Hardy et al. | 364/513 |
| 4,817,092 | 3/1989 | Denny | 371/11 |
| 4,866,635 | 9/1989 | Kahn et al. | 364/513 |
| 4,881,230 | 11/1989 | Clark et al. | 371/20.1 |
| 4,999,833 | 3/1991 | Lee | 370/94.1 |
| 5,047,977 | 9/1991 | Hill et al. | 364/900 |
| 5,157,667 | 10/1992 | Carusone, Jr. et al. | 371/29.1 |
| 5,309,448 | 5/1994 | Bouloutas et al. | 371/29.1 |

OTHER PUBLICATIONS

"ANM : Automated Network Management System" Feridum et al Mar. 1988 –vol. 2 No. 2.
"Correlation of Failure Notifications", IBM Technical Disclosure Bulletin, V37 NO1, Jan. 1994, pp. 659–661.
"IPDS Nack Recovery in an Enhanced Expert System Framework", IBM Technical Disclosure Bulletin V36 N10, Oct. 1993, pp. 79–83.

*Primary Examiner*—Robert W. Beausoliel, Jr.
*Assistant Examiner*—Phung My Chung
*Attorney, Agent, or Firm*—Whithman, Curtis, Whithman & McGinn; Jeffrey S. Labaw

[57] ABSTRACT

A limited multi-fault system and method manages error recovery in a local area network system. The system includes a data structure which store related error events, diagnostic problems and causes. In addition, a method of managing error events in real time and identifying causes and recommending actions is provided. A knowledge base is used to determine the causes and recommended actions for the problem.

9 Claims, 5 Drawing Sheets

LAN EXPERT Server

PROBLEM DETERMINATION METHOD FOR LOCAL AREA NETWORK SYSTEMS

This application is related to co-pending application Ser. No. 08/266,074 filed on Jun. 27, 1994, which is herein incorporated by reference.

DESCRIPTION

BACKGROUND OF THE INVENTION

FIELD OF THE INVENTION

The present invention generally relates to a method and apparatus for managing, analyzing and providing information regarding problems and conditions for local area network (LAN) systems and, more particularly, to an event correlation and problem determination (ECPD)system which analyzes error events and provides information regarding the possible causes of the event and recommended actions based on the data stored in a knowledge base.

DESCRIPTION OF THE PRIOR ART

It is common for computer systems, in particular local area networks (LANs), to have numerous error events, the majority of which require different messages to be sent to the user and the occurrence and performance of many different complex actions for recovery. These errors result from a variety of conditions, including configuration errors, hardware errors and communication errors.

At present, error analysis and problem resolution is often handled manually by LAN administrators. There are two problems with this approach. The first is that the error messages often contain vague or incomplete information. An example of this would be the error message "internal software error". The administrator must then decipher the error message or perform additional work to determine the actual cause of the error. The second problem with manual error code resolution is that one problem can often generate multiple error messages, especially in a LAN system. Therefore, the LAN administrator is often overwhelmed by the number of errors that need to be analyzed. Furthermore, the analysis and review of errors is knowledge intensive. Therefore, it has been difficult to implement a non manual method or system for managing error messages.

Some attempts have been made in the past to implement an error manager; however, these have been unsuccessful due to the large amount of information which must be stored and the knowledge required. In some cases, error managers have been implemented with complicated in-line code which is called after an error event is recognized. Other implementations have used "table driven" error management. However, since each error event can have many action codes and each unique error event/action code Fair must be represented, this system was inefficient in representation and storage. Furthermore, none of these methods provide a system which enables users to modify the error handling method. There is currently no standard method for correlation of errors and problem determination.

Error management requires problems and causes to be correlated so that information regarding the error can be analyzed and provided. At present, most problem determination systems use the single fault assumption wherein only a single fault can exist in a system at one time and that fault is associated with a single cause. The single fault assumption could be used with a complex network system or computer system. Other complex systems use the multi fault assumption, however, this is computationally too expensive for a real time system. Therefore, it could not provide error information in real time.

SUMMARY OF THE INVENTION

It is therefore an object of the present invention to provide a method of analyzing and correlating error messages, in a LAN environment.

It is another object of the present invention to provide a method for determining the possible causes of an error event and providing recommended actions.

It is also an object of the present invention to perform problem determination and event correlation in real time.

It is a further object of the present invention to provide a structure and method for problem determination and error event correlation.

According to the invention, a method and system for determining problems in a computer system, and in particular in a local area network system, are provided. An inference engine is provided to analyze and correlate error messages in real time and provide information regarding causes of the error events and possible recommended courses of action to resolve the error events.

The method for error management provided by the present invention utilizes a knowledge base to evaluate the error message and to determine if it is a repeated error message, if it is triggered by another message or if the error should be clustered with other error events. New in-coming events are compared with those already received and processed until all of the correlated events have been received, and then a diagnostic conclusion is reached.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
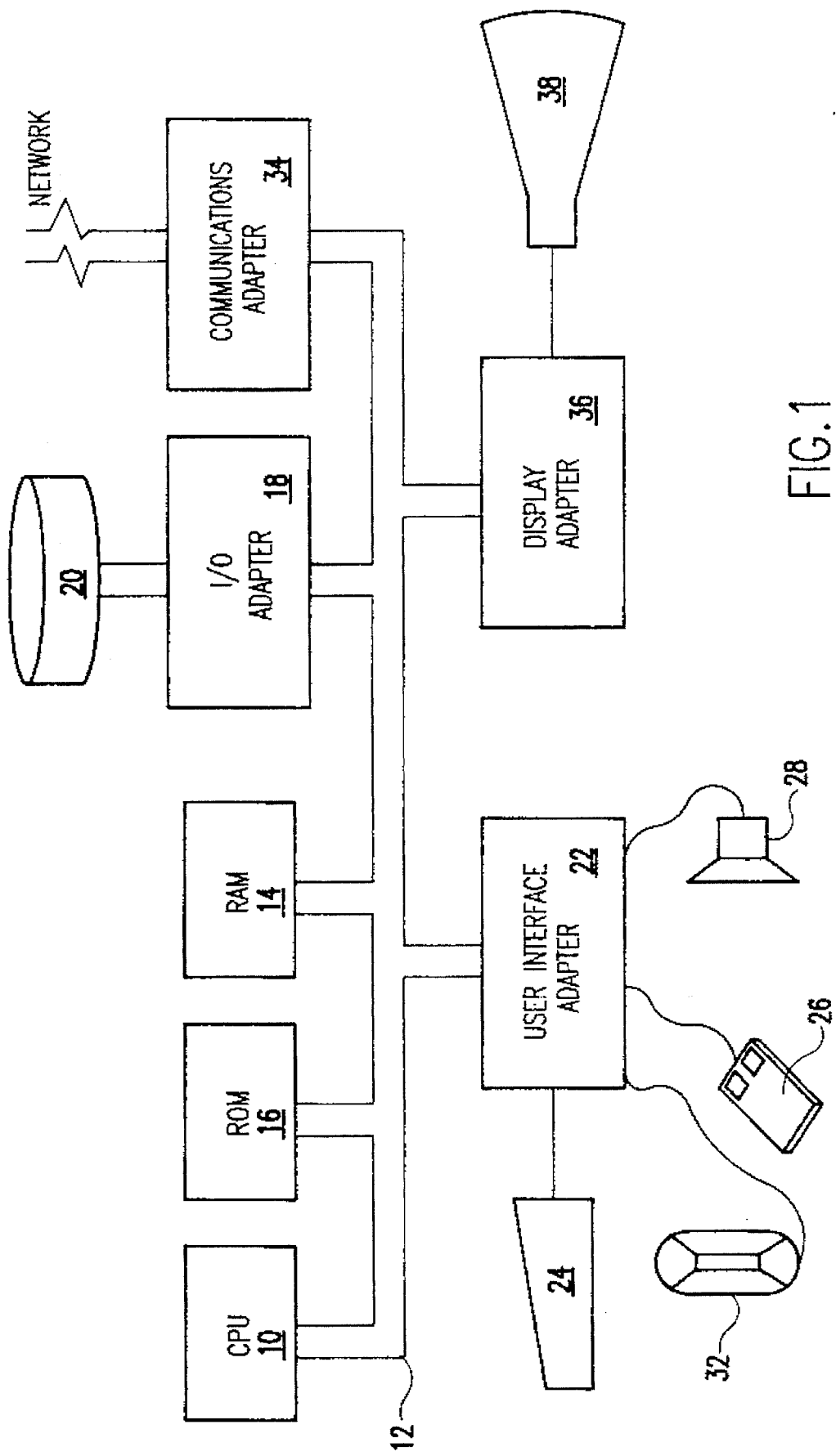
FIG. 1 is a block diagram showing a hardware configuration on which the subject invention may be implemented.

Referring now to the drawings, and more particularly to FIG. 1, there is shown a representative hardware environment which can be used as a server or requester in a LAN system and on which the subject invention may be implemented. This hardware environment may be a personal computer such as the International Business Machines (IBM) Corporation's PS/2 Personal Computers or a workstation such as IBM's RS/6000 Workstations. The hardware includes a central processing unit (CPU) 10, which may be a complex instruction set computer (CISC) micro processor such as the Intel 386, 486 or Pentium microprocessors or a reduced instruction set computer (RISC) microprocessor such as IBM's PowerPC microprocessor. The CPU 10 is attached to a system bus 12 to which are attached a random access memory (RAM) 14, a read only memory (ROM) 16, an input/output (I/O) adapter 18, and a user interface adapter 22. The RAM 14 provides temporary storage for application program code and data, while ROM 16 typically includes the basic input/output system (BIOS) code. The I/O adapter 18 is connected to one or more Direct Access Storage Devices (DASDs), here represented as a disk drive 20. The disk drive 20 typically stores the computer's operating system (OS) and various application programs, each of which are selectively loaded into RAM 14 via the system bus 12. The I/O adapter 18 may support, for example, the Integrated Device Electronics (IDE) interface standard or the Small Computer System Interface (SCSI) standard. In the former case, the I/O adapter 18 typically will support two disk drives in parallel, designated as drives "C:" and "D:". In the latter case, the I/O adapter 18 will support up to nine disk drives connected in a daisy chain. The user interface adapter 22 has attached to it a keyboard 24, a mouse 26, a speaker 28, a microphone 32, and/or other user interface devices such as a touch screen device (not shown). Such touch screen device would optionally be installed on the display 38, here represented as a cathode ray tube (CRT) display but which may be a liquid crystal display (LCD). The display 38 is connected to the system bus 12 via a display adapter 34. A communications adapter 34 is connected to the bus 12 and to a local area network (LAN), such as IBM's Token Ring LAN.

Figure 2:
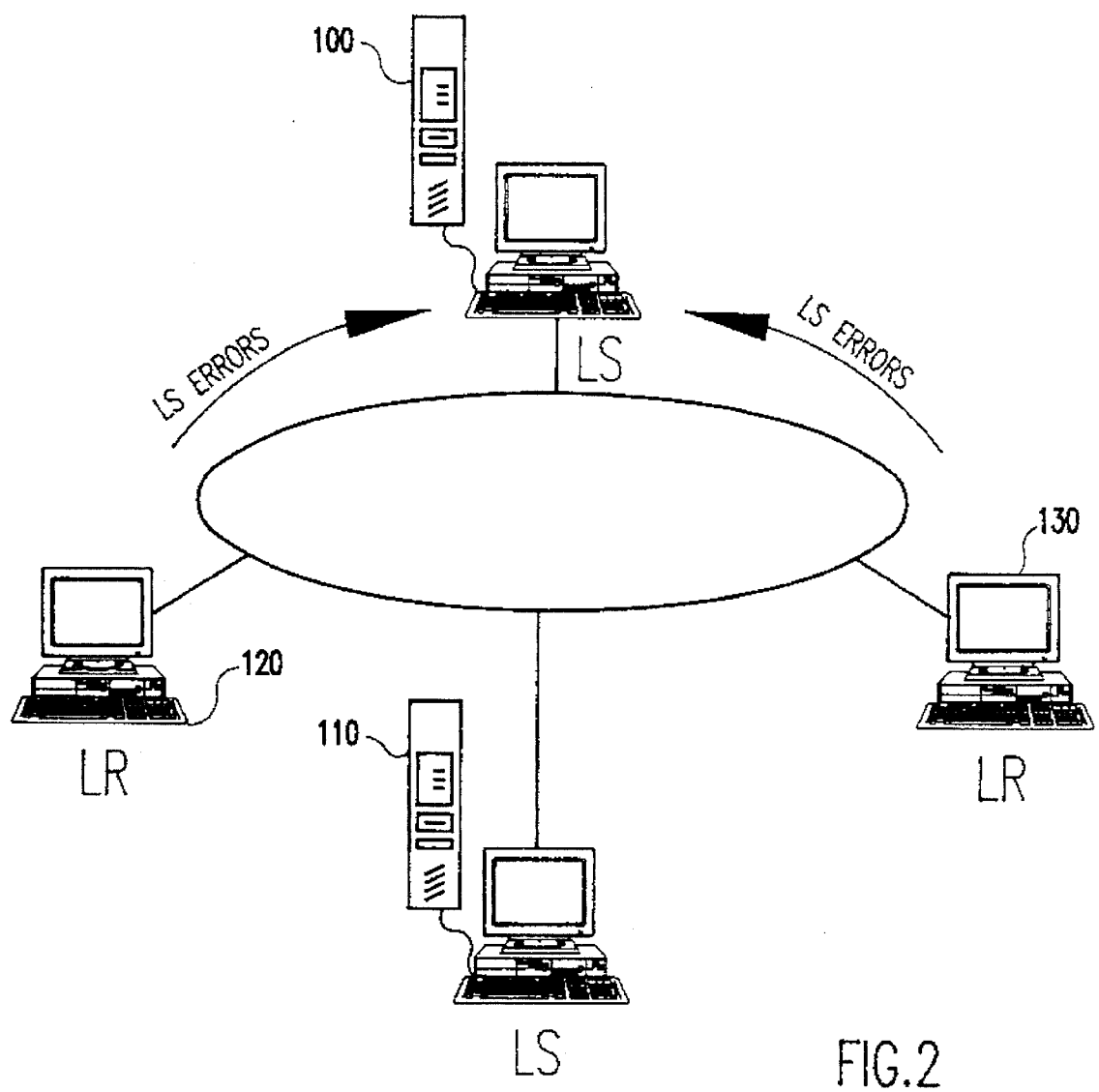
FIG. 2 is a diagram showing an example of a local area network system.

As shown in FIG. 2, a local area network is a system in which personal computers and other computer devices are configured so that resources can be shared and data and information can be internally transferred. As can be seen, a LAN typically includes at least one server 100, 110 and often more than one requester 120, 130. The servers are devices which provide an interface between peripherals and the network. There are many types of servers including data, print, communication, mirror and gateways. As shown in FIG. 2, LAN EXPERT is a problem determination system for a LAN. LAN EXPERT consists of a LAN EXPERT server 100 and LAN EXPERT agents 110, 120, 130. The agents are installed on LAN servers and requesters to monitor their status. When LAN servers and requesters issue error messages, the LAN EXPERT agents receive them and send them to the LAN EXPERT server. The requesters 120 and 130 are LAN expert agents. The LAN EXPERT server receives the error messages from the LAN EXPERT agents. The LAN EXPERT server includes the inference engine, knowledge base, and other components, such as a knowledge base editor and graphical user interface. These are described in detail below and perform the analysis and correlation of error messages and report problems to the users.

As discussed supra, communication and data transmission between a server and other servers or peripheral devices often results in error events. The event correlation and problem determination system is a method for use in a LAN system for diagnosing problems. It uses an expert system model and is preferably implemented using artificial intelligence technology. It is understood that an expert system is a system that processes information and performs functions in manner similar to a human who is an expert in the field. An expert system draws inferences based on the information contained in a knowledge base. A knowledge base, in general, is a data base that contains information about human experience relating to a particular application and data from previously solved problems. An inference engine is also a component of an expert system and is used to apply the principles of reasoning to draw conclusions from the information stored in the knowledge base.

Figure 3:
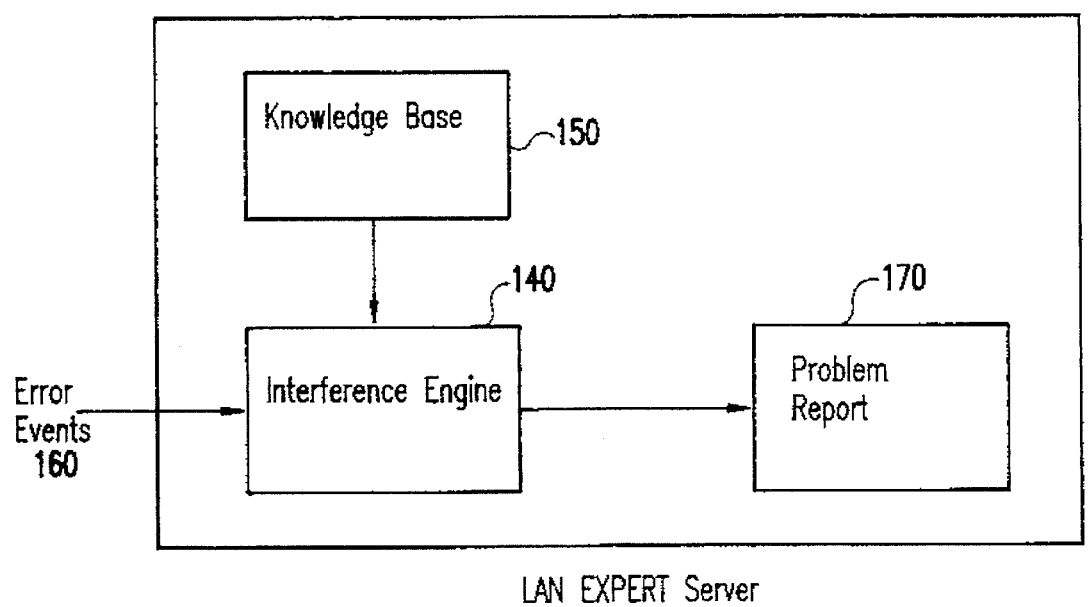
FIG. 3 is an high level overview of the error management system as implemented for a LAN system.

As shown in FIG. 3, the event correlation and problem determination system consists of an inference engine 140 and a knowledge base 150 to process and evaluate error events 160. The knowledge base contains causal relationships between error messages and possible causes. A user can modify and expand the data base with a knowledge base editor. The knowledge in the knowledge base is read by the inference engine and then, the inference engine uses the data to process incoming error events and diagnose the possible causes. After the information is processed by the inference engine, a problem report is generated 170. This is set forth in more detail below.

As used in regard to this invention, an event is a notification sent by a device, for example a server, database manager or communications manager to the inference engine. An event consists of at least three entities, an error message, a reporting machine and an event creation time. Other entities can be included where necessary.

An error message, as noted above, is a part of an event and is issued by a device, for example a LAN server or requester, when a problem is encountered. The agents of the device, in particular the LAN EXPERT, receive the error messages and send them to the LAN EXPERT server. In general, an error message has an alphanumeric identification and a text section which is a brief description of the problem. The text section may also include variables that are given values at run-time. A message which has variables with actual values is called an instantiated message. A non-instantiated message is termed generic.

A cause, in terms of the present invention, is the underlying reason why something did not work and is the part of the system that has to be fixed. A cause consists of a verbal description which can include variables. For example, a typical cause might be: File X is corrupted. The identity of the corrupted file is determined at run time. A cause can be either generic or instantiated. In addition, a cause does not contain any information about the location of the problem. Therefore, a located cause is one which has a cause paired with a machine.

Finally, a problem report contains information from the inference engine's diagnosis including a cause or causes, a set of events that are related to the cause or causes and the recommended actions to fix the problem.

The relationships between causes and error messages described supra is based upon a limited multi fault approach wherein if an error message M is received, only one fault as indicated by M can be true. In other words, all causes of an error message are mutually exclusive and exhaustive. In addition, multiple faults can occur on a server, requester or computer system, however, they do not associate with the same error message.

A representation of the limited multi fault approach In terms of probability is as follows:

$$P(C(i)*(C(k)|M)=1 \text{ and } P(1), \ldots, C(n)|M=1$$

In these equations, $\{C(1), \ldots, C(n)\}$ is the set of all possible faults of M, and $C(i)$ and $C(k)$ are any two of such faults. Error messages and causes can include variables and it is assumed that $\{C(1), \ldots, C(n)\}$ contains all possible instantiated causes.

The method of associating causes and error messages is set forth in pseudo code below.

```
LOOP
{
    receive an event E;
    let S = {S(1), ... , S(m)} all current clusters;
    FOR all the cluster S(i) in S DO
    {
        IF E intersects with S(i)
        THEN
        {
            E joins in S(i);
            IF S(i) has a single fault left
            THEN
            {
                report S(i);
                S = S - S(i);
            };
            BREAK;
        }
    }
    IF E does not intersect with any cluster
    THEN
    {
        let NEW_S be a new cluster;
        NEW_S.EVENTS = {E};
        NEW_S.CAUSES = all causes associated with E;
        NEW_S.TIME = the create time of E;
        S = S + NEW_S;
    }
}
```

In the above pseudo code, a cluster S(i) is a data structure which holds the partial diagnostic result for a potential problem. In addition, S(i).EVENTS contains a set of error messages that are correlated with this potential problem and S(i).CAUSES contains a set of causes which are potential candidates for the problems.

It should be noted that an error message E will intersect with a cluster S(i) if the intersection of the error messages associated causes and the cause set of S(i) is not empty. In addition an error message E is joined into a cluster S(i) as follows:

S(i).EVENTS=S(i).EVENTS*UNION* E;

S(i).CAUSES=S(i).CAUSES*INTERSECT* E.CAUSES:

In the LAN expert system, a cluster S(i) is reported to the users either when only one cause is left or when a user specifiable time limit has been reached.

As discussed previously, a cluster is a data structure which is used to store a partial diagnostic result. Each cluster will contain correlated events and possible causes for each potential problem. A cluster includes a unique identification number or code; a set of instantiated and related events; a set of instantiated or partially instantiated causes; and the earliest time recorded for an event out of the set of events in the cluster. This data structure can be illustrated as follows:

```
{data structure CLUSTER
    CLUSTER_ID: an integer;
    EVENTS: a set of events;
    CAUSES: a set of causes;
    TIME: earliest time of all events in EVENTS;
}
```

The inference engine forms cluster c1 when event e1 is received. The c1.EVENT will contain e1, and c1.CAUSES will contain all of time possible causes of event e1. The causes for each event are defined in a knowledge base. The variables in the causes might be instantiated by the event. When a new event, e2, is received, it is compared with c1 and any other clusters to determine whether e2 should join c1 or not. The method of determining which cluster an event should enter is set forth below in pseudo code.

```
JOIN (CLUSTER e1, EVENT e2)
{
    SET cause_set = {}; /* cause set contains a set of causes,
    initially empty */
    cause_set = intersection (e1.causes, e2.causes);
    if cause set is not empty
    then /*e2 intersects with e1, e2 joins e1; */
    {
        e1. CAUSES = cause_set;
        e1. EVENTS = e1. EVENTS.union.e2;
        e1.TIME = earliest time of events in e1.EVENTS;
        return (TRUE);
    }
    else
        return (FALSE);
}
```

It should be noted that e2. CAUSES contains all of the possible causes of e2, as defined in the knowledge base. In addition, the intersection procedure called is a set intersection operation as would be understood by one of skill in the art.

As shown, if the intersection of the causes of e2 and c1 is not empty, then event e2 will join cluster c1; otherwise, e2 will form its own cluster. As the number of events in a cluster increases, tile number of causes decreases and the variables are instantiated. As soon as a cluster contains only one fully instantiated cause, a diagnostic conclusion is reached. The conclusion reflects the cause of the problem which remains in c1.CAUSES, and this is determined to have caused the issuance of all of the events in c1.EVENTS. The information contained in the data structure is provided to the inference engine so that a problem report can be generated.

Figure 4:
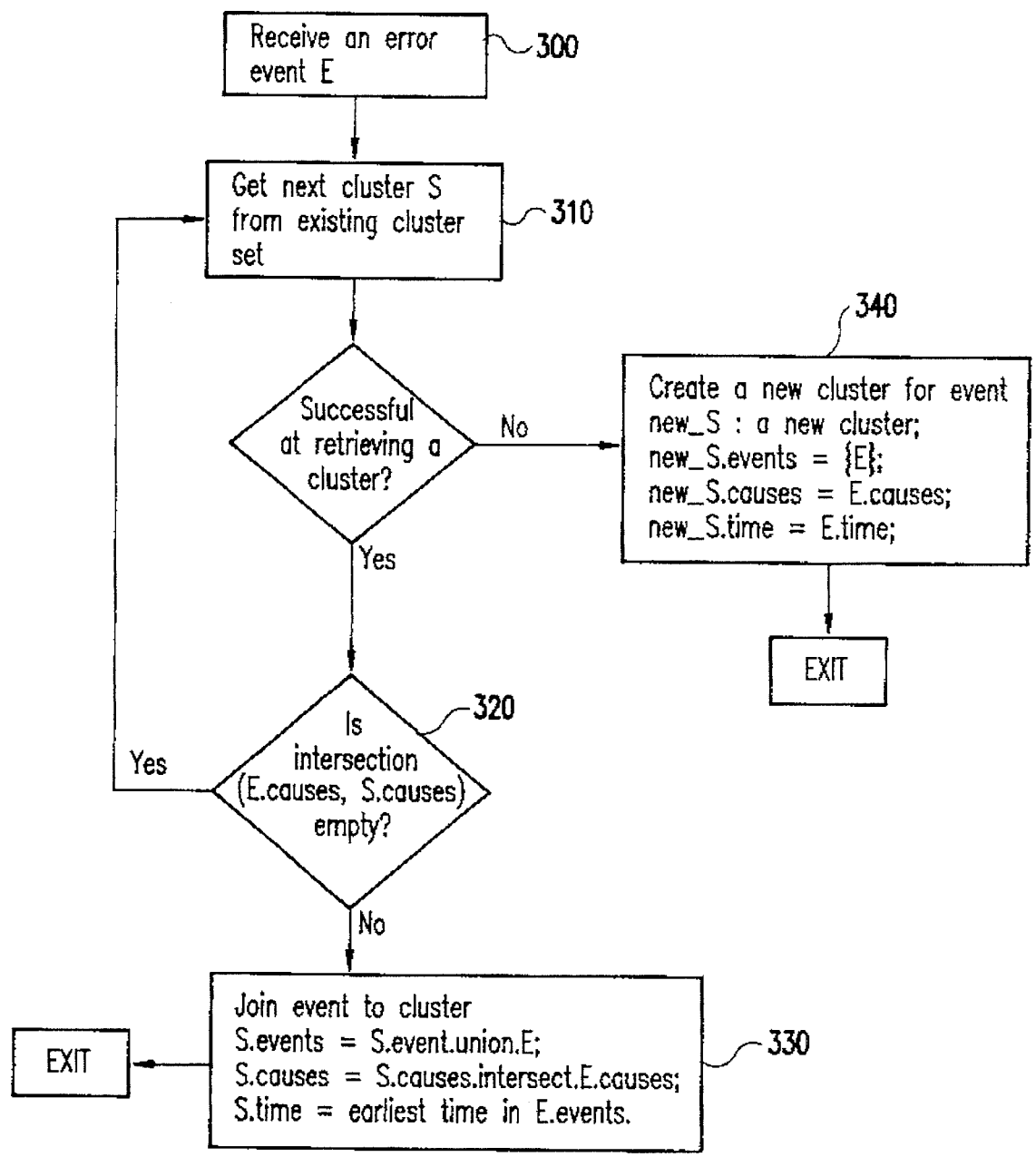
FIG. 4 is a flow diagram showing the method of clustering causes events.

FIG. 4 is a flow diagram illustrating the method for clustering causes and events. First, an event is received 300. Then a loop is entered wherein the causes of the event are compared to the causes of a cluster to determine if they intersect. As shown in block 310, first, the next cluster S is obtained from an existing cluster set. If there are no more clusters, then a new cluster is created 340 and then processing terminates. If there are more clusters, then it is determined whether the intersection of the event and duster causes is empty 320. If so, then the loop continues by returning control to block 310. If the intersection is not empty, then the event will join cluster S 330. Finally the processing terminates.

Figure 5:
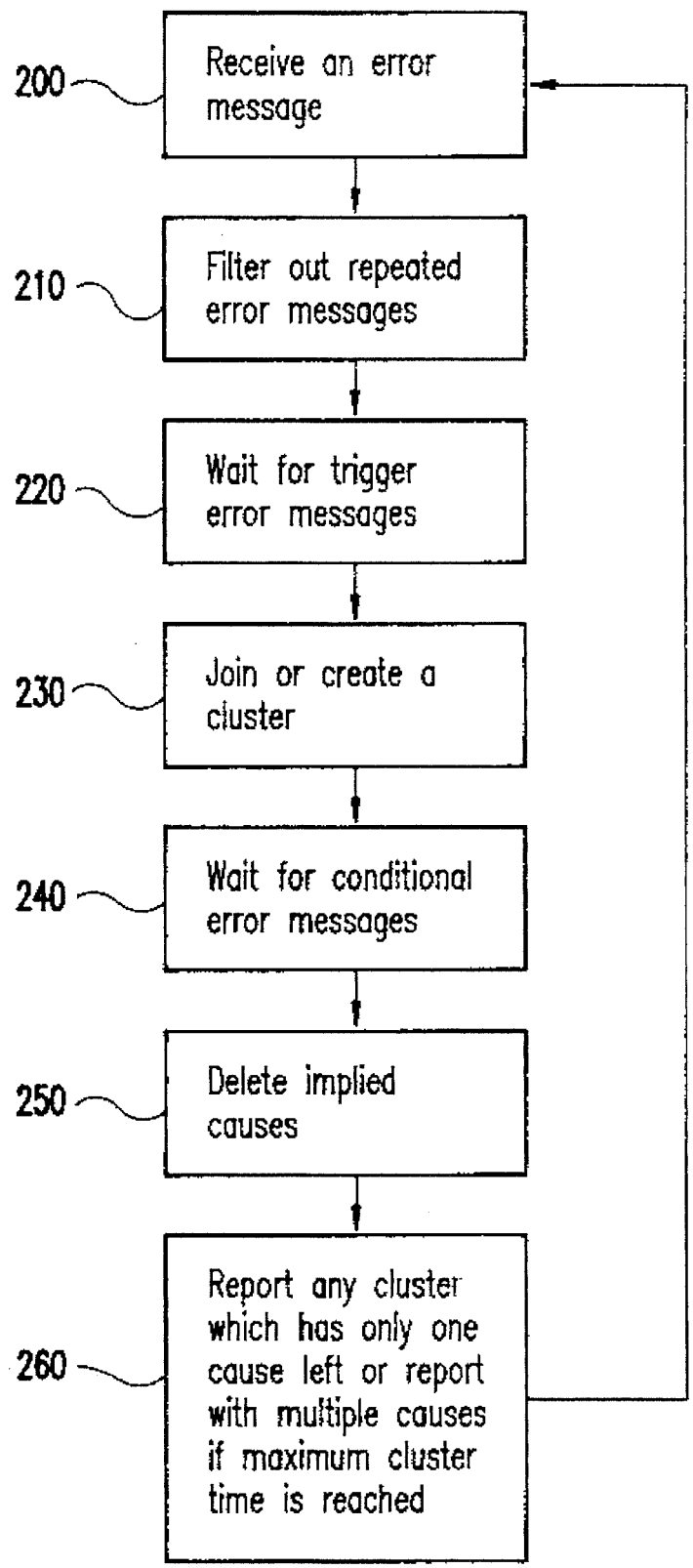
FIG. 5 is a flow diagram showing the method of analyzing and correlating error events and providing recovery actions.

FIG. 5 provides a flow diagram of the analysis and processing of an event by the inference engine. The inference engine receives error events in the order in which the errors arrive 200. For each error event, the knowledge base is called to identify the error message. If the error message is recognized, information about its possible causes is retrieved and attached to the event.

Then, the incoming error message is compared with other already received events to filter out repeated error messages 210. The error message is then analyzed to determine if the message is triggered, or set off, by another message 220. If so, then the already received error messages are checked to determine whether the triggering message has arrived or not. If the triggering message has arrived, then the new error message will be disregarded; otherwise, the inference engine will wait a determinable period of time until an error message is processed as a normal error message is processed. At this point, the incoming error message is compared with existing diagnostic problems, termed a cluster, to determine if the error message shares common causes with all of the error messages in the cluster 230. If there are common cause, then the new error message will join the existing cluster, and if not, a new cluster will be created for a new diagnostic problem. A more detailed description of the cluster structure is provided infra. In addition to determining how to cluster an error message, the engine determines whether an error message/cause pair bears a condition 240. If so, then the processing is suspended for a user configurable amount of time before the condition is evaluated. Next, the causes in a cluster are evaluated to determine whether one cause in a cluster implies another cause 250. If so, then the implied cause is discarded. Finally, if the cluster has one fully instantiated cause left, then a problem report will be generated and will provide information regarding all of the messages correlated in tile cluster, the cause and the recommended action for fixing the cause 260. The control is then returned to the receiving step.

The inference engine also reviews the status of the clusters. A cluster will be maintained for a user configurable period of time, termed the problem_life_time. At the expiration of the problem_life_time, the cluster is discarded from memory. In addition, tilere is a maximum time which can be set for the reporting of a problem. After the cluster_max_time, if there is still more than one cause left in the cluster, a problem report will be generated with multiple causes. It should be noted that an error event can join a duster after a problem report has been generated; however, it must be prior to the expiration of the problem_life_time. The new event provides additional information for the reported problem. Another problem report, the late_problem_report, will be generated which includes the new error message information. The late_problem_report will have the same problem identification number as the original problem report.

It should be noted that the design and structure of the error manager system is easy to maintain, extend, and verify. In addition, it is a very efficient design. It is easy to find, understand and modify any problems with a particular error event since all of the data about an event, its recovery actions and messages can be found in the knowledge base. In addition, a knowledge base enables new error messages to be easily added to the system. It should be noted that the knowledge base can be edited while the system is running. Furthermore since the LAN expert automatically correlates error messages, a,suer would not have to analyze an error message but would receive a diagnosed problem.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A limited multi-fault method of managing error events in a local area network (LAN) having one or more LAN servers, a plurality of LAN requesters, a LAN EXPERT server and a plurality of LAN EXPERT agents, the LAN EXPERT server being connected to said LAN and including an inference engine, a knowledge base containing relationships between possible causes and error messages, and a user interface for reporting problems and interacting with a user, the LAN EXPERT agents being installed on LAN servers and LAN requesters to monitor a status of the LAN servers and LAN requesters, said method comprising the steps of:

receiving by the LAN EXPERT agents error messages issued by said LAN servers and LAN requesters on which they are installed and sending the error messages to the LAN EXPERT server;

receiving by the LAN EXPERT server error messages sent by all LAN EXPERT agents, a received error message being an event to be diagnosed by the inference engine of the LAN EXPERT server;

forming by the inference engine of the LAN EXPERT server an event cluster for a received error message, wherein a cluster is a data structure that holds partial diagnostic results containing correlated events and possible causes and wherein both events and causes have associated variables;

accessing by the inference engine the knowledge base of the LAN EXPERT server to retrieve all related causes for an event corresponding to a received error message as defined in the knowledge base, wherein variables in causes can be instantiated by the event;

comparing by the inference engine of the LAN EXPERT server subsequent error messages with each cluster to determine whether subsequent events should join a cluster or not;

joining by the inference engine of the LAN EXPERT server a subsequent event to a cluster if a mathematical intersection of causes of the subsequent event and causes of the cluster is not empty, otherwise, forming by the inference engine a new event cluster for the subsequent event, whereby as more and more events are joined in a cluster by the inference engine, a number of causes decreases and variables are instantiated so that when a cluster contains only one fully instantiated cause, a diagnostic conclusion is reached; and reporting by the user interface of the LAN EXPERT server diagnostic information generated by the inference engine.

2. The limited multi fault method as recited in claim 1 wherein if said causes and said events have associated instantiated variables, said joining step includes a computation of a mathematical intersection of said variables, wherein if said intersection of said variables is not empty then said event will join said cluster.

3. A diagnostic system for limited multi-fault management of error events in a local area network (LAN) comprising:

a plurality of LAN requesters;

one or more LAN servers, a LAN server providing service for LAN requesters;

a LAN EXPERT server connected to said LAN and including an inference engine, a knowledge base containing relationships between possible causes and error messages, and a user interface for reporting problems and interacting with a user; and a plurality of LAN EXPERT agents installed on LAN servers and LAN requesters to monitor a status of the LAN servers and LAN requesters;

said LAN EXPERT agents receiving error messages issued by said LAN servers and LAN requestors on which they are installed and sending the error messages to the LAN EXPERT server;

said LAN EXPERT server receiving error messages sent by all LAN EXPERT agents, a received error message being an event to be diagnosed by the inference engine of the LAN EXPERT server;

said inference engine of the LAN EXPERT server forming an event cluster for a received error message, wherein a cluster is a data structure that holds partial diagnostic results containing correlated events and possible causes and wherein both events and causes have associated variables;

said inference engine accessing the knowledge base of the LAN EXPERT server to retrieve a cluster containing all related causes for an event corresponding to a received error message as defined in the knowledge base, wherein variables in causes may be instantiated by the event;

said inference engine of the LAN EXPERT server comparing subsequent error messages with each cluster to determine whether subsequent events should join a cluster or not;

said inference engine joining a subsequent event to a cluster if a mathematical intersection of causes of the subsequent event and causes of the cluster is not empty, otherwise, said inference engine forming a new event cluster for the subsequent event so that, as more and more events are joined in a cluster by the inference engine, the number of causes decreases and variables are instantiated and when a cluster contains only one fully instantiated cause, a diagnostic conclusion is reached; and said user interface of said LAN EXPERT server reporting diagnostic information generated by the inference engine.

4. A diagnostic system for managing error events in a local area network (LAN) comprising:

at least one LAN server connected in said local area network; a plurality of LAN requesters connected in said local area network;

a LAN EXPERT server, the LAN EXPERT server being connected in said local area network and including an inference engine, a knowledge base containing relationships between possible causes and error messages, and a user interface for reporting problems and interacting with a user; and a plurality of LAN EXPERT agents, the LAN EXPERT agents being installed on LAN servers and LAN requesters to monitor a status of the LAN servers and LAN requesters, said LAN EXPERT agents transmitting error messages to said LAN EXPERT server, the inference engine of said LAN EXPERT server forming event clusters for received error messages, accessing said knowledge base to retrieve all related causes for an event corresponding to a received error message and joining events to a cluster in a process wherein a number of causes of events in clusters are decreased to reach a diagnostic conclusion, the diagnostic conclusion being reported via said user interface of the LAN EXPERT server.

5. The diagnostic system as recited in claim 4 wherein both events and causes have associated variables and variables in causes can be instantiated by an event, said inference engine joining a subsequent event to a cluster if a mathematical intersection of causes of the subsequent event and causes of the cluster is not empty so that, as more and more events are joined in a cluster by the inference engine, a number of causes decreases and variables are instantiated and when a cluster contains only one fully instantiated cause, said diagnostic conclusion is reached.

6. A diagnostic method determining a cause of an error in a local area network (LAN) comprising the steps of:

receiving by LAN EXPERT agents error messages issued by LAN servers and LAN requesters on which the LAN EXPERT agents are installed and sending the error messages to a LAN EXPERT server connected to the local area network;

forming by an inference engine of the LAN EXPERT server an event cluster for a received error message as a data structure holding partial diagnostic results containing correlated events and possible causes;

accessing by the inference engine a knowledge base of the LAN EXPERT server to retrieve all related causes for an event corresponding to a received error message as defined in the knowledge base;

determining by the inference engine whether subsequent events should be joined in a cluster and joining by the inference engine those subsequent events determined that should be joined to clusters so that as more and more events are joined in a cluster by the inference engine, a number of causes decreases and a diagnostic conclusion is reached; and reporting by a user interface diagnostic information generated by the inference engine.

7. The diagnostic method as recited in claim 6 wherein said step of determining is performed by comparing by the inference engine the subsequent error messages with event clusters to determine whether a relationship exists between the subsequent error messages and event clusters, further comprising the step of creating a new event cluster for an error message which should be joined to existing event clusters.

8. The diagnostic method as recited in claim 6 wherein both events and causes have associated variables and variables in causes can be instantiated by an event, said diagnostic conclusion being reached when a cluster contains only one fully instantiated cause.

9. The diagnostic method as recited in claim 7 wherein if said causes and said events have instantiated variables associated with them, said determining step includes a computation of a mathematical intersection of said variables, wherein if said intersection of said variables is not empty then said event will join said cluster.

* * * * *

UNITED STATES PATENT AND TRADEMARK OFFICE
CERTIFICATE OF CORRECTION

PATENT NO. : 5,539,877
DATED : July 23, 1996
INVENTOR(S) : Alex Winokur, Joseph Shiloach, Amnon Ribak, and Yuangeng Huang It is certified that error appears in the above-indentified patent and that said Letters Patent is hereby corrected as shown below:

On the title page, item [75], please delete "Kiriak" and insert --Kiriat--.

On the title page, under "Attorney, Agent, or Firm", please delete "Whithman", both occurrences, and insert --Whitham--.

Signed and Sealed this

Twenty-sixth Day of November 1996

*Attest:*

BRUCE LEHMAN

*Attesting Officer*  *Commissioner of Patents and Trademarks*